United States Patent [19]

Yang

[11] Patent Number: 5,472,604

[45] Date of Patent: Dec. 5, 1995

[54] FILTRATION DEVICE WITH SWIVELING SPRAY TUBE

[76] Inventor: Mu-Tsang Yang, No. 52 Ta Pikg Rd., TC TI LI, Sha Lu Chen, Taichung Hsien, Taiwan

[21] Appl. No.: 354,000

[22] Filed: Dec. 6, 1994

[51] Int. Cl.⁶ ................................................. B01D 29/68
[52] U.S. Cl. .................... 210/409; 210/414; 210/420; 210/448; 210/452; 137/549; 141/387
[58] Field of Search ...................... 210/407, 409, 210/411, 412, 413, 414, 420, 446, 448, 451, 452, 453, 455, 456; 239/118; 137/549; 141/70, 387

[56] References Cited

U.S. PATENT DOCUMENTS

| | | |
|---|---|---|
| 4,624,785 | 11/1986 | Drori ........................................ 210/414 |
| 4,654,141 | 3/1987 | Frentzel ................................. 210/409 |
| 4,867,879 | 9/1989 | Muller ..................................... 210/414 |
| 5,108,592 | 4/1992 | Wilkins et al. ......................... 210/409 |

Primary Examiner—Robert A. Dawson
Assistant Examiner—W. L. Walker
Attorney, Agent, or Firm—Browdy and Neimark

[57] ABSTRACT

A filtration device comprises a housing, a filtering apparatus, a first guide tube, a second guide tube, an impurities discharging tube and a valve. The filtering apparatus is provided therein with a swiveling spray tube pivoted thereto. The swiveling spray tube is provided in the wall thereof with bevel through holes. The housing is provided therein with a high pressure guide tube which has an inner end aligned with an axial hole of the swiveling spray tube and further has an outer end that is connected with a source of a high pressure washing fluid so as to allow the high pressure washing fluid to be injected into the swiveling spray tube for washing away impurities deposited on the inner wall surface of the filtering apparatus.

7 Claims, 3 Drawing Sheets

FILTRATION DEVICE WITH SWIVELING SPRAY TUBE

FIELD OF THE INVENTION

The present invention relates generally to a filtration device, and more particularly to a filtration device which can be washed and cleaned easily.

BACKGROUND OF THE INVENTION

As shown in FIG. 1, a filtration device 10 of the prior art comprises a shell 11, a filtering screen 12, an inlet 15, an outlet 16, an impurities discharging tube 17, and a valve 18. The filtering screen 12 is tubular in shape and is housed in the shell 11 shch that the interior of the shell 11 is divided into a first compartment 13 and a second compartment 14. The inlet 15 is so disposed that it is in communication with the first compartment 13. The outlet 16 is mounted to the side of the shell 11 such that the outlet 16 is in communication with the second compartment 14. The impurities discharging tube 17 is mounted at the lower portion of the shell 11 such that the impurities discharging tube 17 is in communication with the first compartment 13. The valve 18 is fastened with the impurities discharging tube 17. In operation, a fluid to be filtered is injected into the shell 11 via the inlet 15 and is then filtered by the filtering screen 12. The filtered fluid is let out via the outlet 16. The filtered fluid can be filtered repeatedly if necessary. In the filtering process, the particles having diameters greater than the diameter of meshes of the filtering screen 12 are kept in the first compartment 13 such that most of the particles are adhered to the inner wall surface of the filtering screen 12, thereby obstructing the filtration process and slowing down the filtration rate. As the valve 18 is opened, the impurities so collected in the first compartment 13 are discharged via the impurities discharging tube 17.

The prior art filtration device 10 described above is defective in design in that only the impurities suspended in the first compartment 13 can be discharged, and that the impurities adhered to the inner wall surface of the filtering screen 12 can not be washed away effectively. The filtering screen 12 can be dismounted and washed; nevertheless the entire filtration device 10 must be shut down to allow the filtering screen 12 to be removed and washed.

SUMMARY OF THE INVENTION

It is therefore the primary objective of the present invention to provide a filtration device with a filtering element which can be washed and cleaned effectively so as to enhance the filtering efficiency of the filtration device.

The foregoing objective of the present invention is attained by a filtration device, which comprises a housing, a filtering apparatus, a first guide tube, a second guide tube, an impurities discharging tube, a valve, a swiveling spray tube, and a high pressure guide tube. The first guide tube and the second guide tube are fastened to the housing such that the first guide tube is in communication with a first compartment of the filtering apparatus and that the second guide tube is in communication with a second compartment of the filtering apparatus. The impurities discharging tube is in communication with the first compartment. The swiveling spray tube is provided in the wall thereof with a predetermined number of bevel through holes and is located pivotally at the center of the filtering apparatus such that the swiveling spray tube can rotate freely on the pivot on which the swiveling spray tube is pivoted. The high pressure guide tube has an inner end which is aligned with the axial hole of the swiveling spray tube. The outer end of the high pressure guide tube is connected with the supply source of a high pressure washing fluid. The high pressure fluid is sprayed in the filtering apparatus via the bevel through holes of the swiveling spray tube so as to wash away impurities deposited on the inner wall of the filtering apparatus.

DETAILED DESCRIPTION OF THE INVENTION

Figure 1:
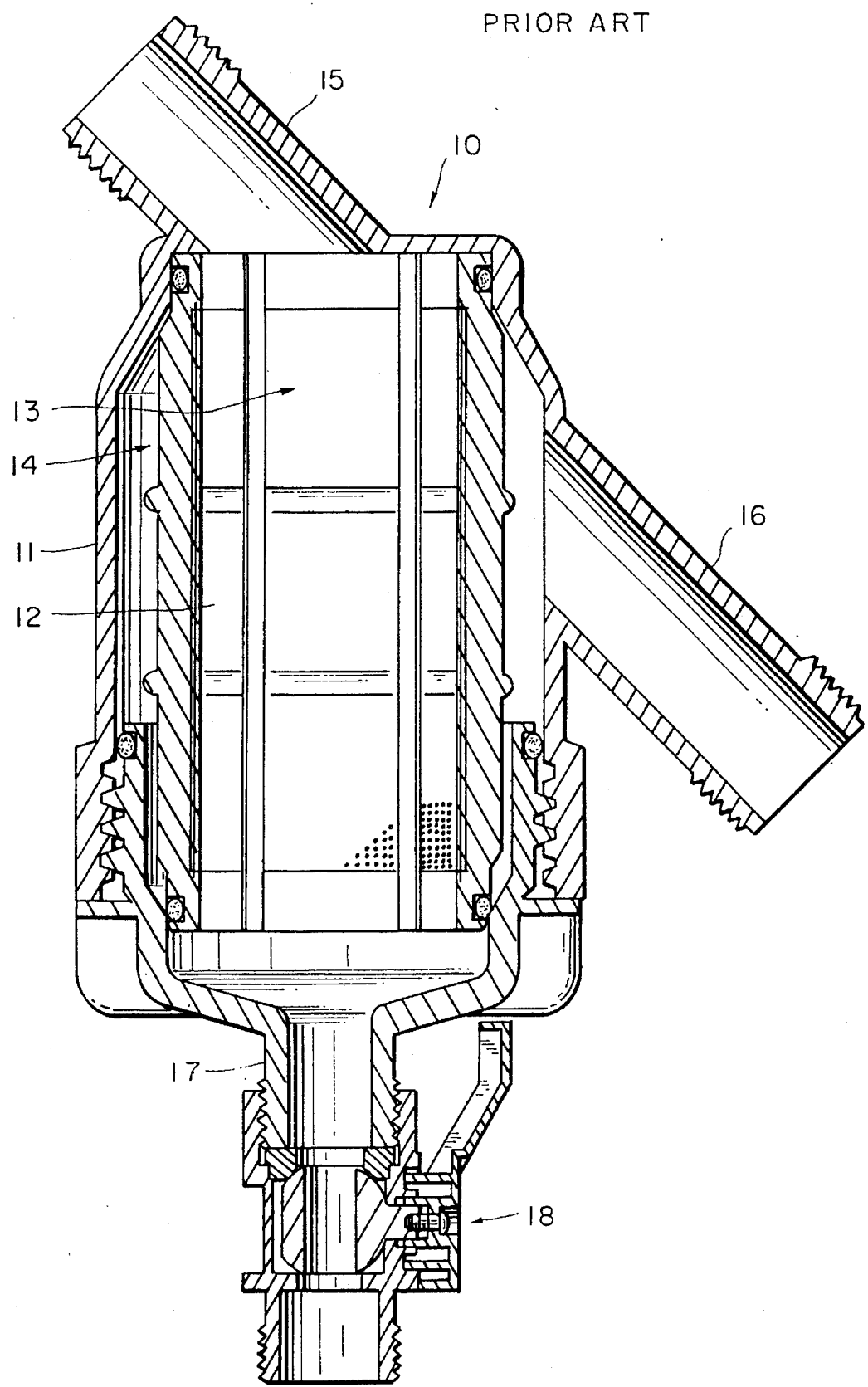
FIG. 1 shows a schematic view of a filtration device of the prior art.
Figure 2:
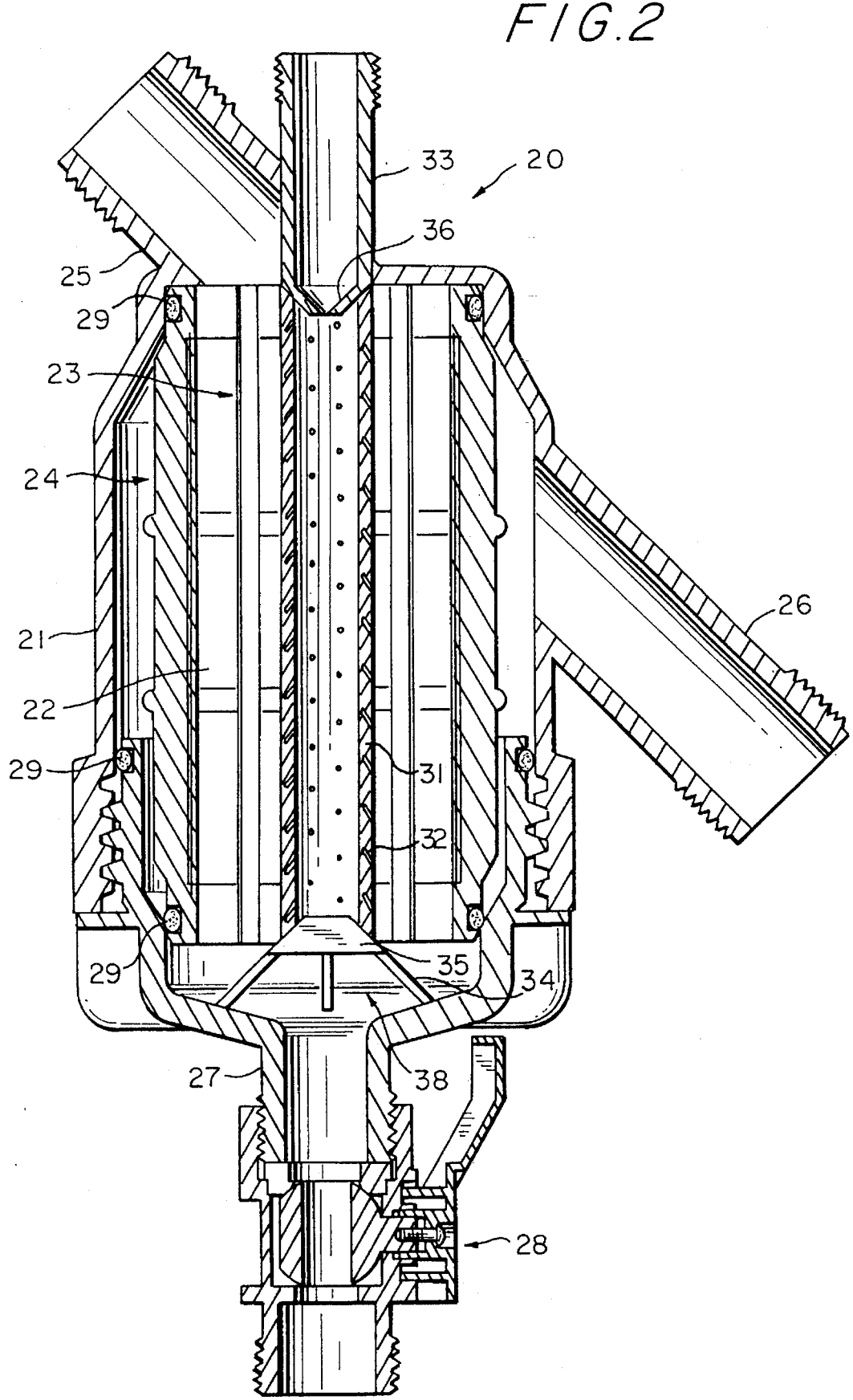
FIG. 2 shows a schematic view of a filtration device of the present invention.
Figure 3:
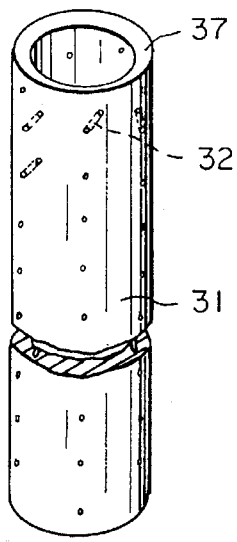
FIG. 3 shows a perspective view of a swiveling spray tube of the filtration device of the present invention.

As shown in FIGS. 2 and 3, a filtration device 20 of the present invention comprises the component parts, which are described hereinafter.

A housing 21 of a cylindrical construction.

A filtering apparatus 22 is slightly tubular in shape and is disposed centrally in the housing 21. The interior of the housing 21 is divided by the filtering apparatus 22 into a first compartment 23 and a second compartment 24.

A first guide tube 25 is mounted on the housing 21 such that the first guide tube 25 is in communication with the first compartment 21.

A second guide tube 26 is mounted on the side of the housing 21 such that the second guide tube 26 is in communication with the second compartment 24.

An impurities discharging tube 27 is fastened to the bottom of the housing 21 such that the impurities discharging tube 27 is located under the housing 21, and that the impurities discharging tube 27 is in communication with the first compartment 23.

A valve 28 is fastened to the impurities discharging tube 27 for controlling the opening and the closing of the impurities discharging tube 27.

The filtering apparatus 22 is a filtration screen having meshes of a predetermined size. In addition, the filtering apparatus 22 may be made of a foam material having open cells, a fabric material, or a nonfabric material. The tubular filtering apparatus 22 has two ends which are provided respectively with a leakproof ring 29 enabling the filtering apparatus 22 to be fastened to the housing 21 in an airtight manner. The impurities discharging tube 27 is fastened to the housing 21 by means of a fastening means. The fluid to be filtered is injected into the first compartment 23 via the first guide tube 25. Upon having been filtered by the filtering apparatus 22, the filtered fluid is injected into the second compartment 24 before being let out via the second guide tube 26.

The filtration device 20 of the present invention is characterized in that the tubular filtering apparatus 22 is provided therein centrally with a swiveling spray tube 31 having in the wall thereof a predetermined number of bevel through holes 32. The swiveling spray tube 31 is fastened pivotally to the filtering apparatus 22 such that the swiveling spray tube 31 can be caused to swivel freely.

The filtration device 20 of the present invention is further characterized in that it comprises a high pressure guide tube 33 which is fastened to the housing 21 such that the inner end of the high pressure guide tube 33 is aligned with the axial hole of the swiveling spray tube 31, and that the outer end of the high pressure guide tube 33 is connected with the source of a high pressure washing fluid for injecting the high pressure washing fluid into the swiveling spray tube 31.

The housing 21 is provided at the lower portion of the interior thereof with a predetermined number of ribs 34 extending upwardly. These ribs 34 are joined together at the tops thereof to form a tapered portion 35 engageable with an annular tapered face 37 of the swiveling spray tube 31. The high pressure guide tube 33 is provided with a tapered nozzle 36 engageable with another annular tapered face 37 of the swiveling spary tube 31. As a result, the swiveling spray tube 31 can be caused to rotate freely.

Figure 5:
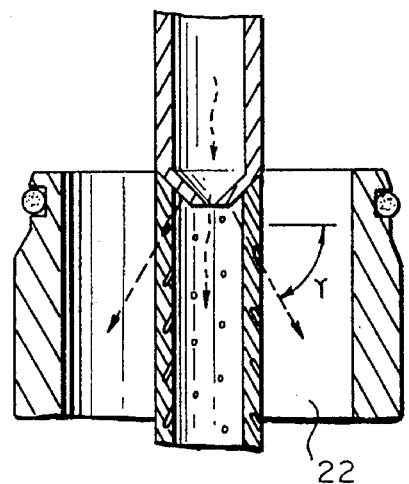
FIG. 5 shows a vertical sectional view of the present invention at work.
Figure 4:
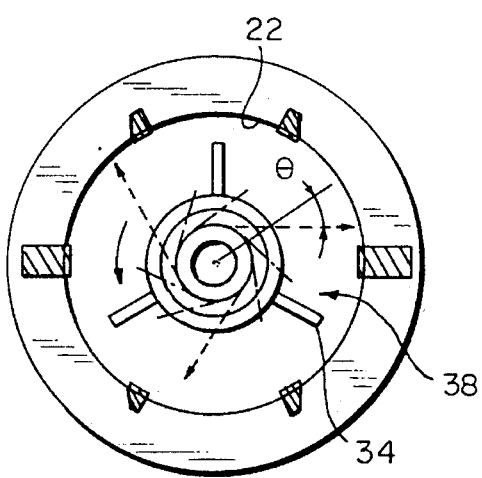
FIG. 4 shows a horizontal sectional view of the present invention at work.

As shown in FIGS. 4 and 5, when impurities are deposited on the inner wall surface of the filtering apparatus 22 to such an extent that the filtration rate is slowed down considerably, the high pressure guide tube 33 is connected with a high pressure washing fluid source so as to allow the high pressure fluid to be injected into the swiveling spray tube 31 via the nozzle 36. The washing fluid is then sprayed out via the bevel through holes 32 of the swiveling spray tube 31. Each of the bevel through holes 32 and the radius of the swiveling spray tube 31 form a predetermined angle, thereby enabling the reaction force of the sprayed fluid to drive the swiveling spray tube 31 to rotate in a direction indicated by an arrow in FIG. 4. As a result, the impurities deposited on the inner wall surface of the filtering apparatus 22 can be washed away effectively. The removal of the deposited impurities can be made easier by providing the swiveling spray tube 31 with a predetermined number of bevel through holes 32, each of which and the horizontal surface form a predetermined angle, as shown in FIG. 5. The inner wall of the filtering apparatus 22 can be more effectively washed and cleaned by the high pressure spray which is dispersed from the top toward the bottom. The impurities so washed away from the inner wall surface of the filtering apparatus 22 are let out by the valve 28 via the gap 38 located between the two adjoining ribs 34 and via the discharging tube 27.

Figure 6:
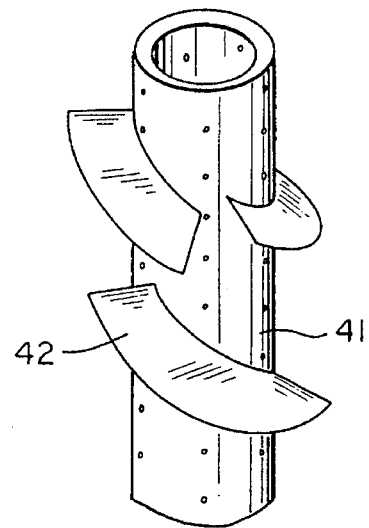
FIG. 6 shows a schematic view of a swiveling spray tube of another preferred embodiment of the present invention.

As shown in FIG. 6, a swiveling spray tube 41 of another embodiment of the present invention is provided on the wall thereof with a predetermined number of scraping pieces 42 of a short spiral construction. The winding direction of the scraping pieces 42 is preferably similar to the rotating direction of the swiveling spray tube 41. The impurities deposited on the inner wall surface of the filtering apparatus can be effectively removed by the scraping pieces 42.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A filtration device comprising:

a housing;

a filtering means tubular in shape and disposed in an interior of said housing such that said filtering means divides said interior of said housing into a first compartment and a second compartment;

a first guide tube fastened to said housing such that said first guide tube is in communication with said first compartment;

a second guide tube fastened to said housing such that said second guide tube is in communication with said second compartment;

an impurities discharging tube fastened to a bottom of said housing such that said discharging tube is in communication with said first compartment; and a valve fastened to said discharging tube for controlling the opening and the closing of said discharging tube;

wherein said filtering means is provided therein centrally with a swiveling spray tube which is provided in a wall thereof with a predetermined number of bevel through holes and is fastened pivotally to a pivot on which said swiveling spray tube can be caused to rotate freely; and wherein said housing is provided therein with a high pressure guide tube which has an inner end aligned with an axial hole of said swiveling spray tube and which further has an outer end connected with a source of a high pressure washing fluid so as to allow said high pressure washing fluid to be injected into said swiveling spray tube for washing away impurities deposited on an inner wall surface of said filtering means.

2. The filtration device according to claim 1 wherein said inner end of said high pressure guide tube is provided with a nozzle.

3. The filtration device according to claim 1 wherein said housing is provided in a lower portion of said interior thereof with a predetermined number of ribs, which are joined together at top ends thereof to form a tapered portion engageable with an annular tapered face of said swiveling spray tube.

4. The filtration device according to claim 1 wherein each of said bevel through holes of said swiveling spray tube forms a predetermined angle with a radius of said swiveling spray tube.

5. The filtration device according to claim 1 wherein each of said bevel through holes of said swiveling spray tube forms a predetermined angle with a horizontal surface of said swiveling spray tube.

6. The filtration device according to claim 1 wherein said swiveling spray tube is provided on a wall surface thereof with a predetermined number of scraping pieces for removing impurities deposited on said inner wall surface of said filtering means.

7. The filtration device according to claim 6 wherein said scraping pieces are of a short spiral construction having a winding direction corresponding to a rotating direction of said swiveling spray tube.

* * * * *